(12) United States Patent
Desai et al.

(10) Patent No.: US 7,230,360 B2
(45) Date of Patent: Jun. 12, 2007

(54) SWITCHED RELUCTANCE MACHINE

(75) Inventors: Piyush C. Desai, Des Plaines, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 10/983,469

(22) Filed: Nov. 8, 2004

(65) Prior Publication Data

US 2006/0097596 A1 May 11, 2006

(51) Int. Cl.
*H02K 17/42* (2006.01)
(52) U.S. Cl. ..................................... 310/168; 310/166
(58) Field of Classification Search ................ 310/155, 310/162, 166, 168
See application file for complete search history.

(56) References Cited

U.S. PATENT DOCUMENTS

| | | | |
|---|---|---|---|
| 4,609,862 A | 9/1986 | Becker et al. | |
| 4,748,362 A * | 5/1988 | Hedlund | 310/168 |
| 4,883,999 A | 11/1989 | Hendershot | |
| 4,998,052 A | 3/1991 | Erdman et al. | |
| 5,015,903 A | 5/1991 | Hancock et al. | |
| 5,023,502 A | 6/1991 | Johnson | |
| 5,111,095 A | 5/1992 | Hendershot | |
| 5,355,069 A | 10/1994 | Bahn | |
| 5,378,952 A | 1/1995 | Schäffersmann | |
| 5,386,162 A | 1/1995 | Horst | |
| 5,719,456 A | 2/1998 | Kolomeitsev | |
| 5,789,883 A | 8/1998 | Gilman | |
| 5,973,462 A * | 10/1999 | Kalpathi et al. | 318/254 |
| 6,025,668 A | 2/2000 | Kolomeitsev | |
| 6,028,385 A * | 2/2000 | Pengov et al. | 310/166 |
| 6,051,903 A | 4/2000 | Pengov | |
| 6,114,789 A | 9/2000 | Pengov et al. | |
| 6,150,791 A * | 11/2000 | Fulton | 318/701 |
| 6,242,834 B1 * | 6/2001 | Akemakou | 310/162 |
| 6,700,272 B1 | 3/2004 | Lindner | |
| 6,836,044 B2 * | 12/2004 | Ando et al. | 310/156.38 |
| 2002/0125783 A1 | 9/2002 | Morinigo | |

FOREIGN PATENT DOCUMENTS

| | | |
|---|---|---|
| EP | 0 614 264 A1 | 9/1994 |
| EP | 0 662 751 A1 | 7/1995 |
| JP | 1308193 A2 | 12/1989 |
| JP | 2060494 A2 | 2/1990 |
| JP | 3032387 A2 | 2/1991 |
| JP | 4121095 A2 | 4/1992 |
| JP | 5115191 A2 | 5/1993 |
| JP | 7322589 A2 | 12/1995 |
| JP | 2002186283 A2 | 6/2002 |

* cited by examiner

*Primary Examiner*—Darren Schuberg
*Assistant Examiner*—Nguyen Hanh
(74) *Attorney, Agent, or Firm*—Pauley Petersen & Erickson (57) ABSTRACT

A switched reluctance machine (SRM) having a rotor and stator pole numerical relationship of S number of stator poles and R number of rotor poles, where R=2S−2, when S is greater than 4; provides improved power density, torque production, torque ripple, and acoustic noise, and is readily adaptable to existing hardware such as known controllers and the like.

16 Claims, 10 Drawing Sheets

(KNOWN SRM)

(KNOWN SRM)

(KNOWN SRM)

SWITCHED RELUCTANCE MACHINE

BACKGROUND OF THE INVENTION

1. Field of the Invention

The present invention relates generally to a switched reluctance machine (SRM). The present invention relates more specifically to a SRM having a new relationship between the number of stator poles and rotor poles.

2. Discussion of the Related Art

A switched reluctance machine has salient poles on its stationary member stator and rotating member rotor. SRMs are advantageous in their operation because they do not require permanent magnets or field windings on the rotor. Because of simple and robust construction, fault tolerant capabilities and torque-speed characteristics, SRMs are very popular to provide auxiliary power in aircraft, automotive and vehicular systems, non-conventional energy sources, and other industrial machineries and equipments.

SRMs are realized in a variety of forms. In particular, the constructions differ in the number of stator and rotor poles on the stationary and movable members, respectively, and in the number of independent circuits with which the controller is separately able to switch stator windings in and out of circuit. The stator poles have phase windings on them while the rotor poles have no windings. Each set of windings separately switched in and out of circuit by the controller constitutes one phase of the machine. The machine may have one or more phases.

Torque produced by an SRM is function of the instantaneous phase inductance, and hence the instantaneous rotor position, and the stator coil currents. By nature of the machine characteristics and control strategy, maximum torque is produced when rotor & stator poles are unaligned, while minimum torque is produced at the aligned position. This results in considerable torque ripple and is one of the factors limiting the application of SRMs. For example, it is known that humans can sense very low levels of torque perturbation. There is therefore a desire in the art to minimize the problem of torque ripple, increase torque production, and otherwise improve the operation of SRMs.

SUMMARY OF THE INVENTION

The present invention provides a switched reluctance machine (SRM); whether operated as a motor, generator, or both; having a new relationship between the number of stator poles and rotor poles so as to provide a SRM with a minimal amount of torque ripple and acoustic noise while providing improved power density and torque production. Particularly, the present invention provides a SRM having a salient rotor and stator pole numerical relationship of S number of stator poles, where S>4, and R number of rotor poles, which can be expressed as R=2S−2, such as a S/R pole count in a 6/10, 8/14, or 10/18 configuration.

Although the invention will be principally described with reference to a SRM having six stator poles and ten rotor poles, machines of other sizes and having other than three phases or six stator poles may be designed in accordance with the invention. Also, while the invention is described in relation to an exemplary form of rotary machines, it is equally applicable to other forms of rotary machines and to linear and inverted machines as well. Thus, although the present invention will be described with reference to preferred embodiments, modifications and rearrangements can be made and still be within the scope and spirit of the present invention.

BRIEF DESCRIPTION OF THE DRAWINGS

The objects and features of this invention will be better understood from the following detailed description taken in conjunction with the drawings wherein.

DETAILED DESCRIPTION OF THE PREFERRED EMBODIMENTS

The exemplary embodiment will be set forth in the context of a rotary switched reluctance machine (SRM). It will be appreciated by the person having ordinary skill in the art that a SRM according to the present invention may be arranged in a variety of ways.

Figure 1:
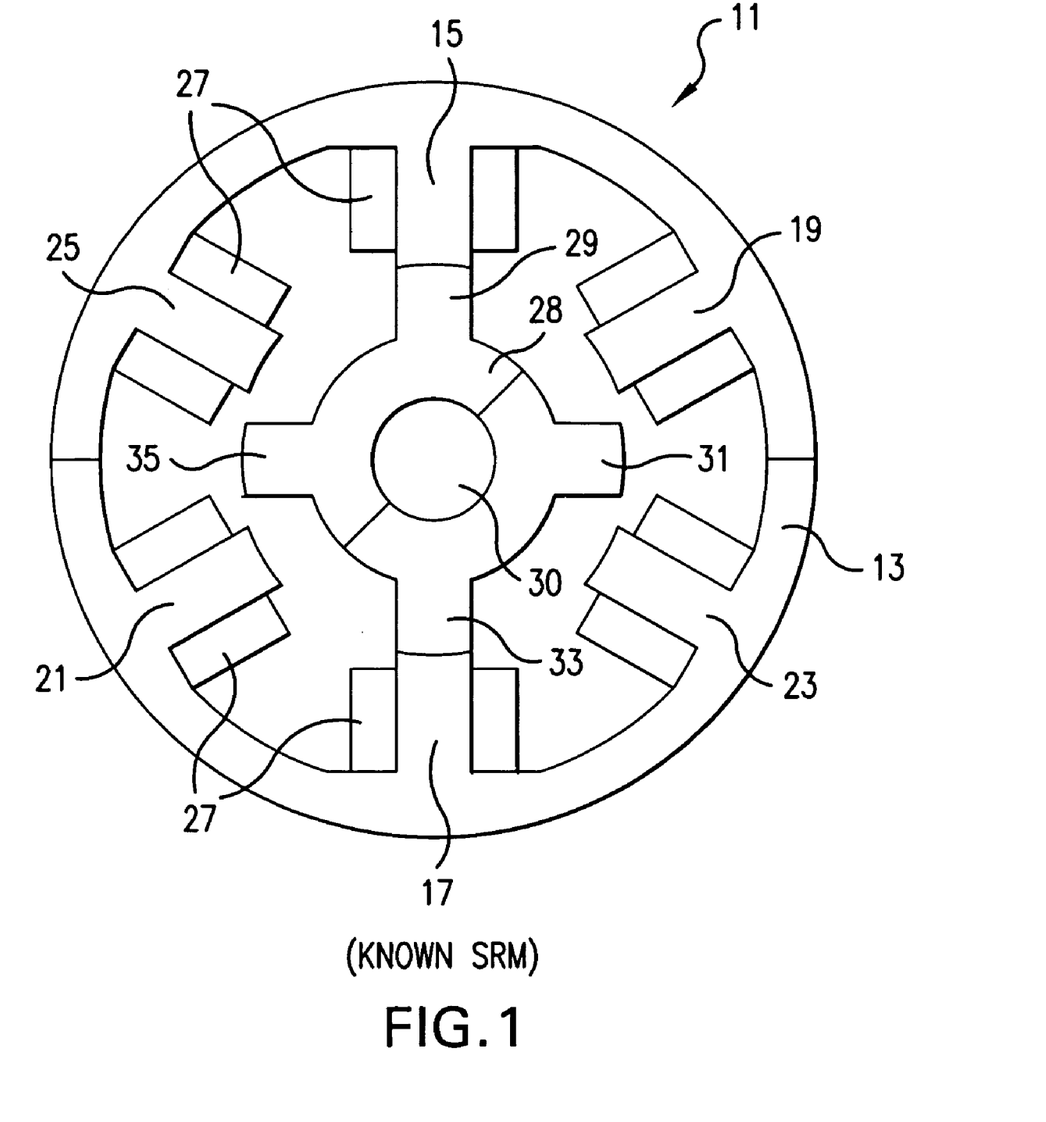
FIG. 1 illustrates a known SRM with 6 stator poles and 4 rotor poles.

FIG. 1 illustrates a known construction of a three-phase salient pole SRM 11. The outer stator 13 has six poles 15, 17, 19, 21, 23, 25 each having a coil, collectively 27, wound around each stator pole. The coils on diametrically opposite stator pole pairs i.e. 15/17, 19/21, and 23/25 are connected in series or in parallel to form a phase of the machine. In general, the number of poles in a stator is double the number of phases. Hence, the machine shown in FIG. 1 is a three-phase machine (Phases A, B and C) with six stator poles 15/17, 19/21, and 23/25, respectively. The rotor 28, affixed to central rotatable shaft 30, has four rotor poles 29, 31, 33, 35.

Figure 2:
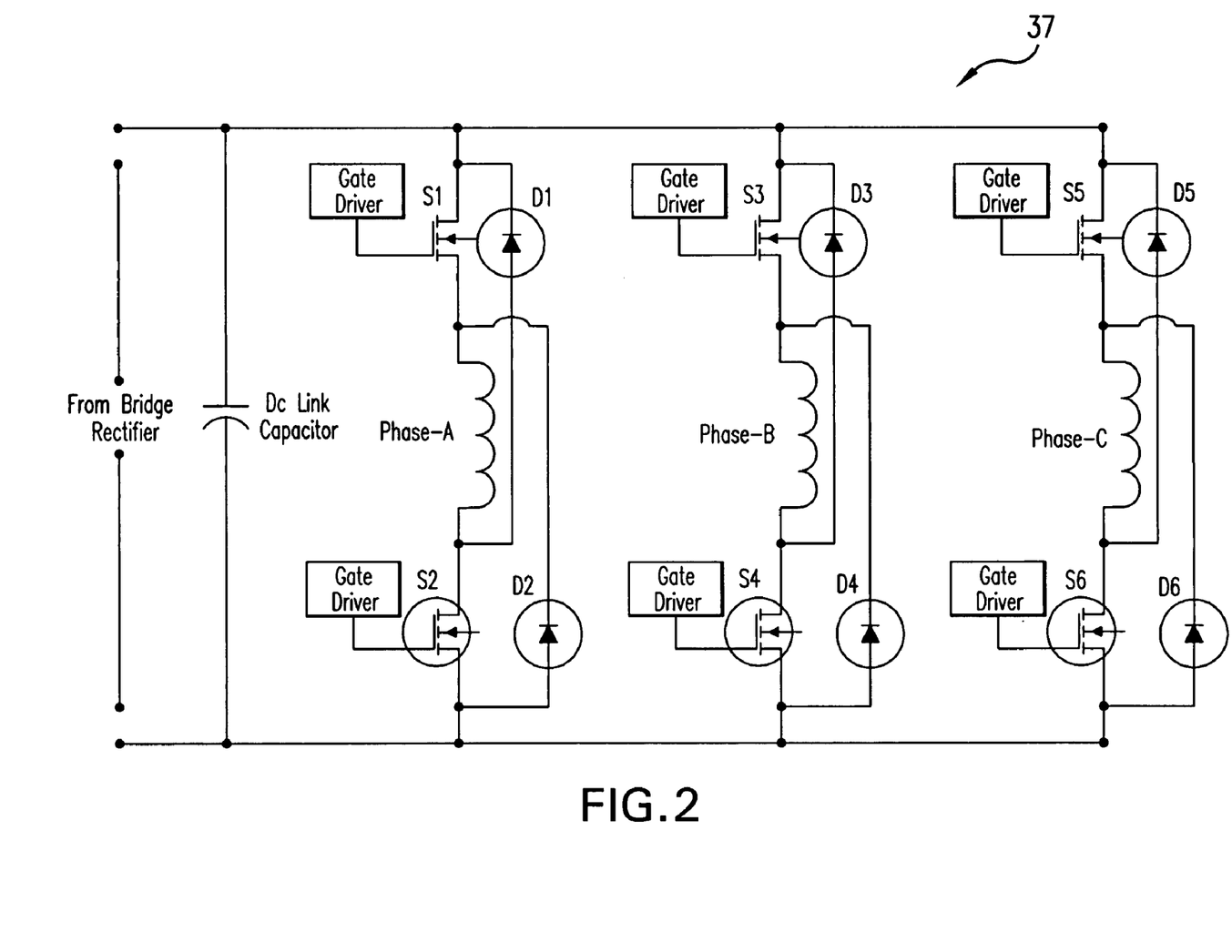
FIG. 2 illustrates a control circuit configuration for an SRM.

To operate the SRM 11 as a motor, each phase is normally connected to an electrical energy source through semiconductor devices. FIG. 2 illustrates one such circuit configuration 37. Current flow can be diverted to the different Phases A, B, C, by rotor position-based control of the switches S1 through S6. Clock-wise sequencing of phase excitation would produce counter-clock-wise rotation of the shaft and vice versa. Usually a phase is kept energized until any two of the rotor poles align themselves with those stator poles having energized coils. This position is referred to as a minimum reluctance position because reluctance to the flux path is at its least between opposite stator poles when the coils on those stator poles experience current flow. The next phase would then be energized once the rotor poles are aligned with corresponding stator poles, e.g., 15/29 and 17/33 as shown for the position in FIG. 1. In the shown position, it is appropriate to energize phase-B to turn the rotor in a counter-clock-wise direction, or energize phase-C to turn the rotor in a clock-wise direction. Subsequent serial phase excitation would than result in continuous rotation of the rotor.

Figure 3:
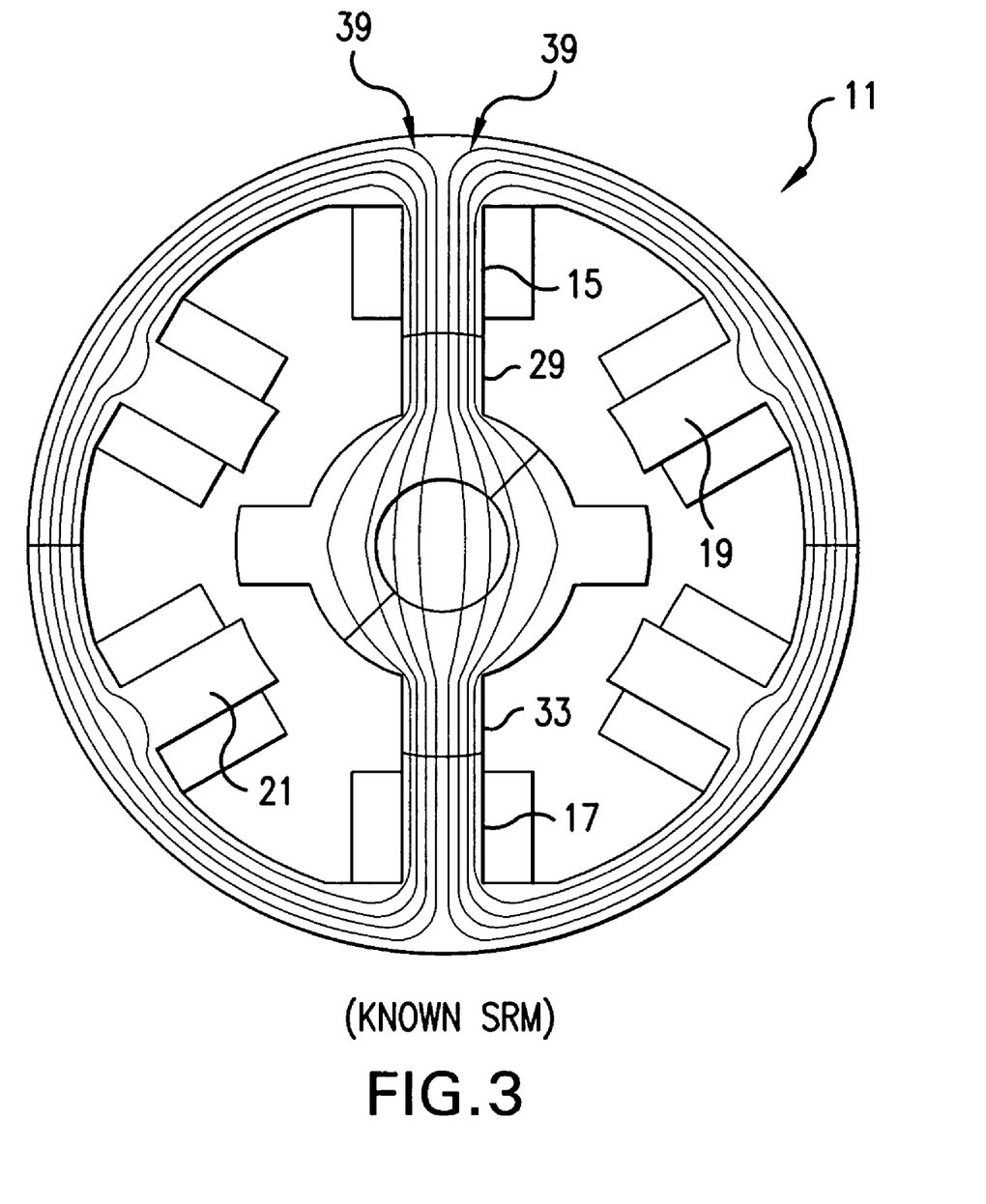
FIG. 3 illustrates flux lines in the known SRM of FIG. 1 at an aligned position.

FIG. 3 shows a distribution of flux lines, collectively 39, when phase-A is energized and rotor poles 29, 33 are aligned to corresponding stator poles 15, 17, respectively. At this minimum reluctance position, the SRM 11 will produce the least torque and hence it is no longer efficient to continue exciting phase-A. Exciting phase-B will cause the rotor to align itself with stator poles having coils connected to Phase B poles 19, 21 to offer a minimum reluctance path to the flux lines established by current in the Phase B coils and hence rotor 28 will turn counter-clockwise to the next aligned position with the Phase B poles 19, 21.

Figure 4:
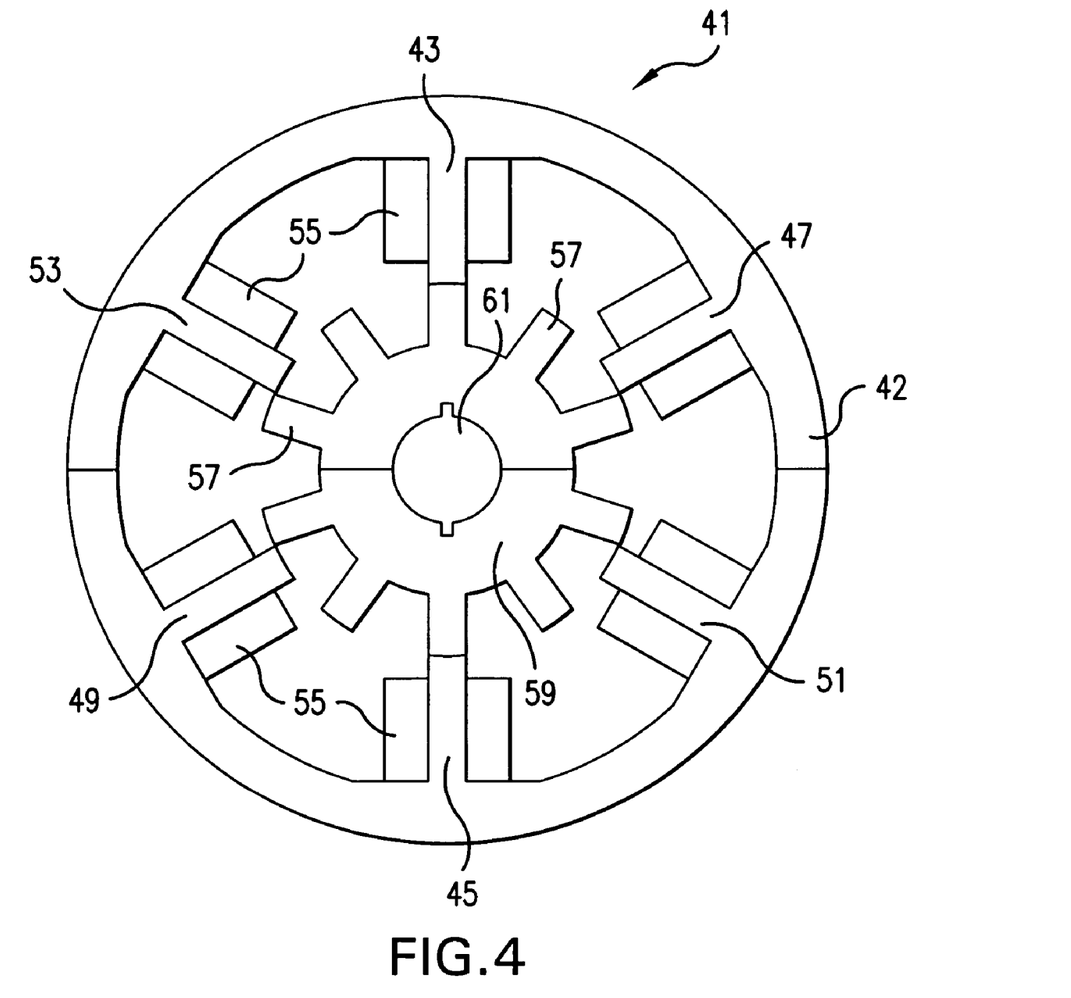
FIG. 4 illustrates an SRM according to the present invention having 6 stator poles and 10 rotor poles.

FIG. 4 shows the present invention in the form of a SRM 41 with a stator 42 having six poles in three phase-pairs 43/45, 47/49, 51/53, i.e., the same number of stator poles as in the known SRM of FIG. 1, for direct comparison therewith, as further discussed below.

The SRM 41 shown in FIG. 4 is a three-phase machine with six stator poles. Each stator pole has a coil, collectively 55, wound around it. Stator poles 43/45 with their associated coils represent phase A. Stator poles 47/49 and their coils represent phase B. Stator poles 51/53 and their coils represent phase C. Ten salient rotor poles, collectively 57, are located on the rotor mechanism 59 which is concentric and affixed to a rotatable central shaft 61, the rotor 59 and shaft 61 being within the concentric stator 42.

The electrical control circuit configuration 37 as shown in FIG. 2 can be readily adapted for the present invention. From the aligned position as shown in FIG. 4, it will be appropriate to excite the coils of phase-B poles 47/49 or phase-C poles 51/53 for counter-clock-wise or clock-wise rotation, respectively. This will cause the rotor poles to align themselves to the corresponding stator poles to offer a least reluctance path.

Figure 5:
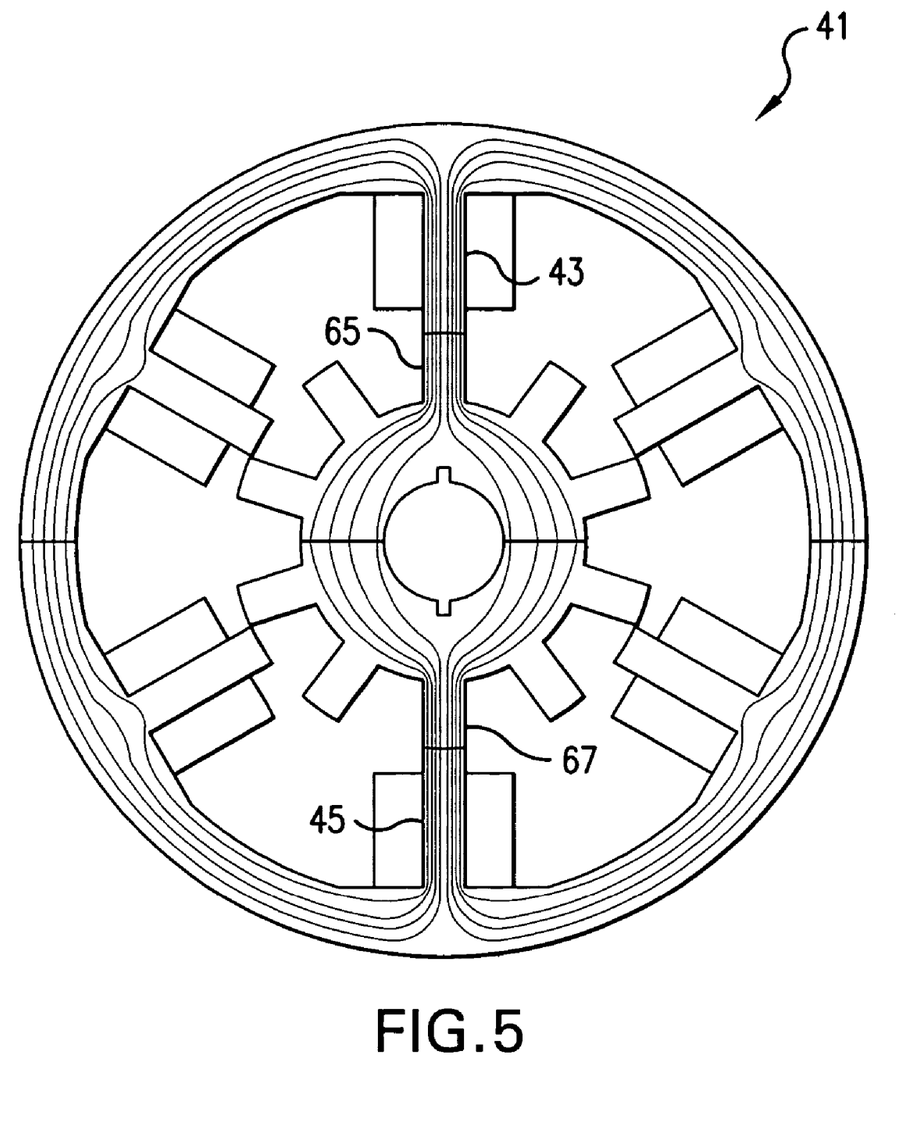
FIG. 5 illustrates flux lines in the SRM of FIG. 4 at an aligned position.

FIG. 5 shows the flux lines for the present SRM 41 when phase-A is excited and rotor poles 65, 67 are aligned with stator poles 43, 45. Similarity of flux lines for the present embodiment and that of the prior art demonstrate a symmetry of the structure in both the designs, indicate that present theories and knowledge concerning the physical behavior of known SRMs can be readily applied or adapted to operation of the present invention.

Figure 6:
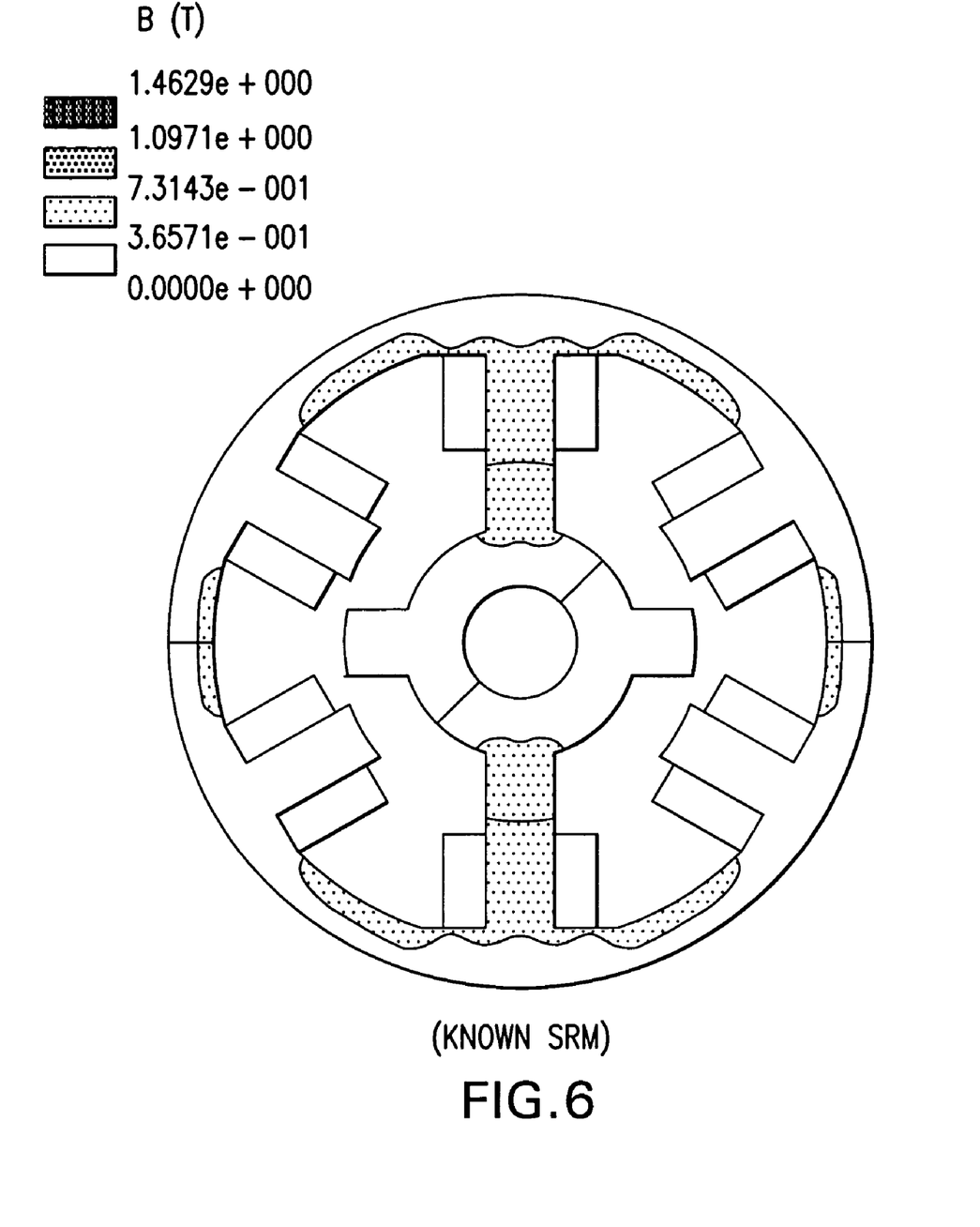
FIG. 6 illustrates a magnetic flux density in the known SRM of FIG. 1.
Figure 7:
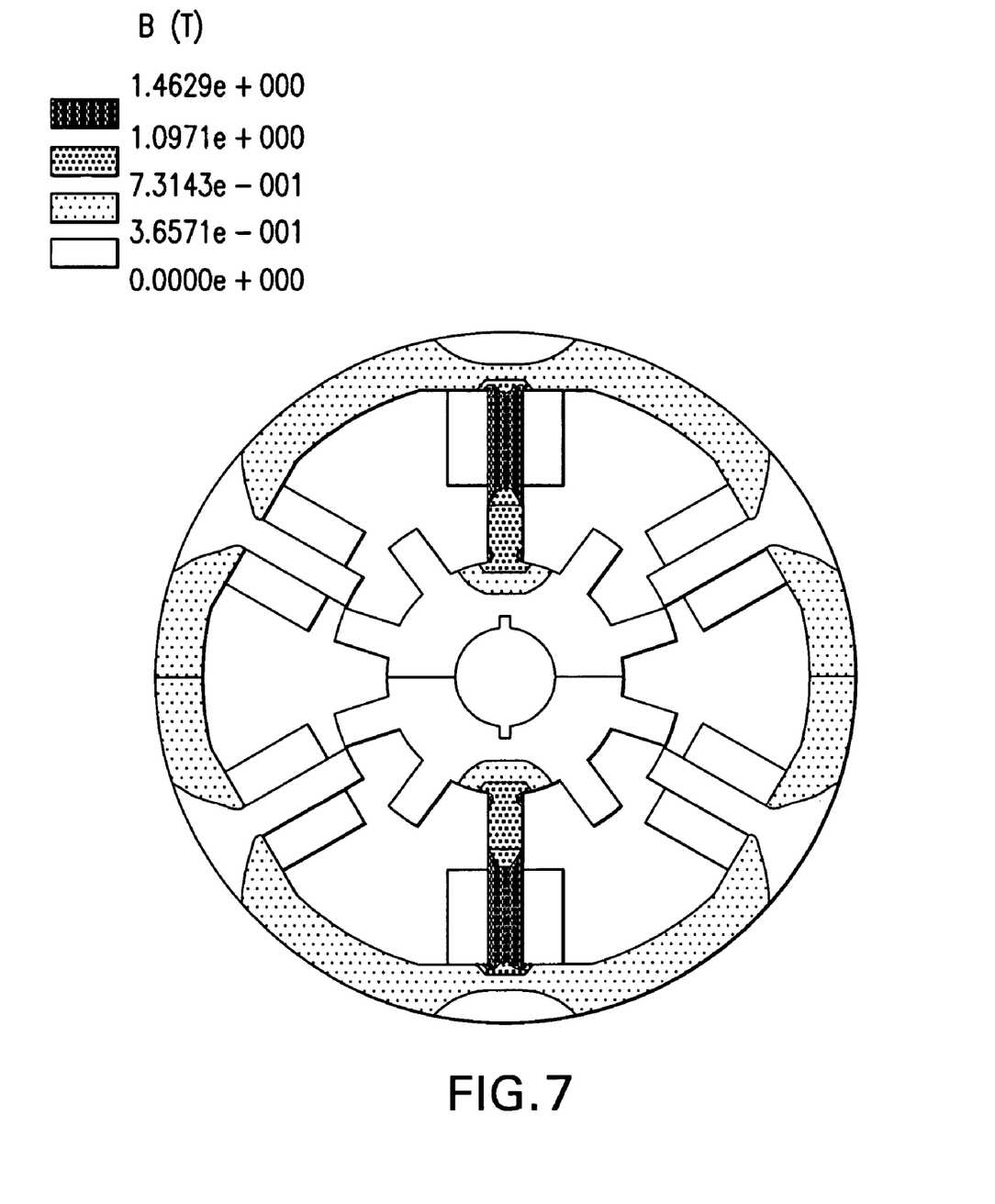
FIG. 7 illustrates a magnetic flux density in the exemplary SRM of FIG. 4.

FIG. 7 shows distribution of magnetic flux density for the present embodiment at the same instant. A comparison of magnetic flux density plots in FIG. 6 for the known SRM of FIG. 1 versus an SRM of FIG. 7 according to the present invention shows the possibility of driving the present invention SRM into deep saturation more easily than a conventional SRM motor, thus further increasing the performance advantage of the present invention SRM.

Figure 8:
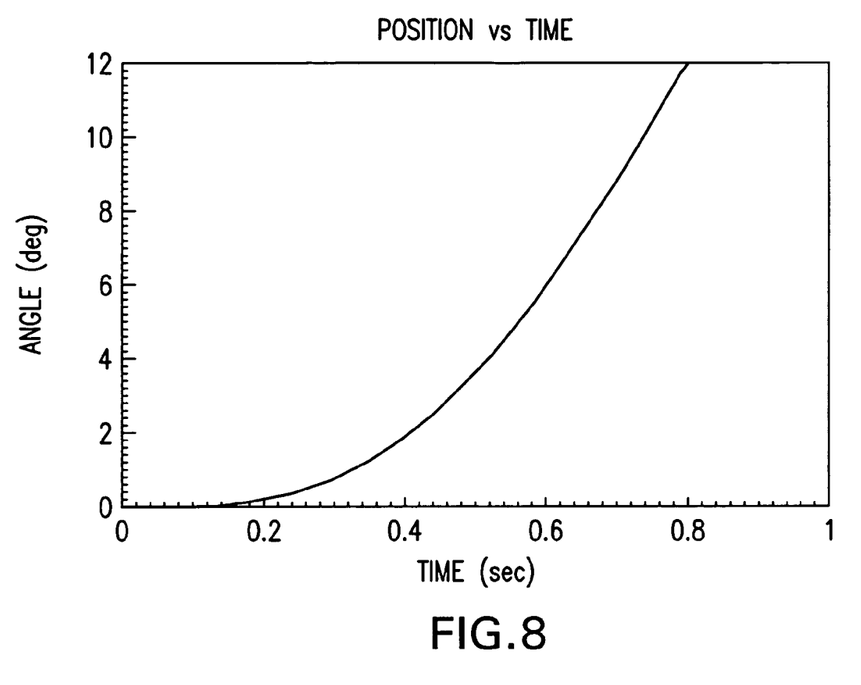
FIG. 8 is a graph of rotor angle versus time for the exemplary embodiment of the present invention.
Figure 9:
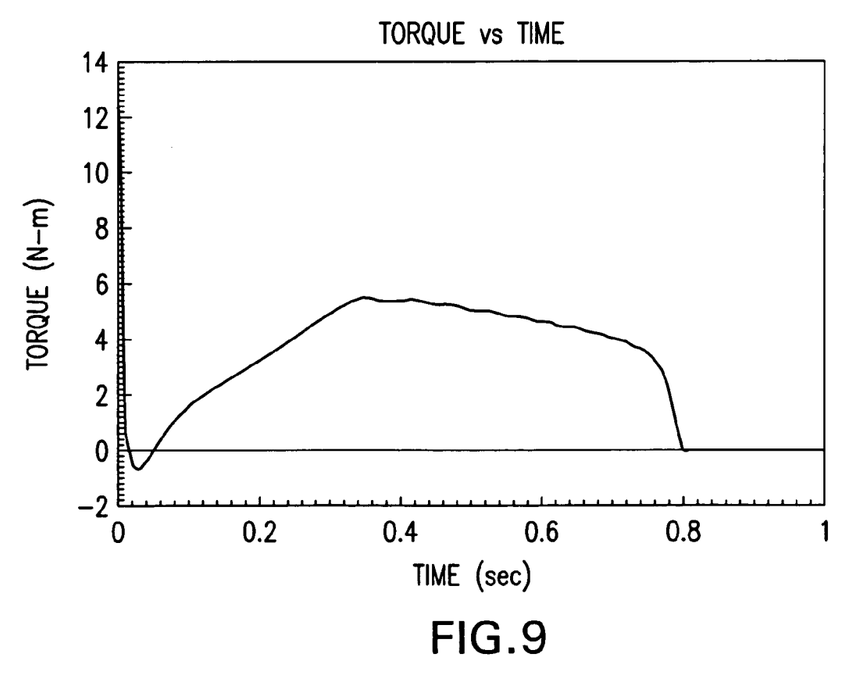
FIG. 9 is a graph of torque produced versus time for the exemplary embodiment of the present invention.

A computer simulation of the SRM 41 shown in FIG. 4 was performed to generate the time graphs of FIG. 8 and FIG. 9 for rotor position and torque, respectively, produced by the SRM 41 (FIG. 4). For this, the motor is assumed to be in a position of having two diametrically opposite rotor poles 57 aligned with the stator poles 43, 45 having the phase-A coils as shown in FIG. 4. From this instance on, the phase-B coils on stator poles 47, 49 are energized to cause the rotor 59 to align to a new position by turning counter-clockwise. Computer simulation with transient analysis capabilities is performed to generate accurate data for speed and torque. FIG. 8 and FIG. 9 graph the rotor angle and torque, respectively, of the present SRM 41 on a time scale. Note that the shaft 61 has to travel 12 degrees [$\{2*360/10-360/6\}=12$] from its zero position i.e., the initial position. Once the rotor 59 turns counter-clock-wise and rotor poles 57 are aligned with the phase-B coil stator poles 47, 49, the rotor 57 will not move further without further excitation. It is thus apparent from the graph of FIG. 9 that torque production decreases rapidly as the rotor approaches an aligned position and then finally drops to zero at the aligned position.

Figure 10:
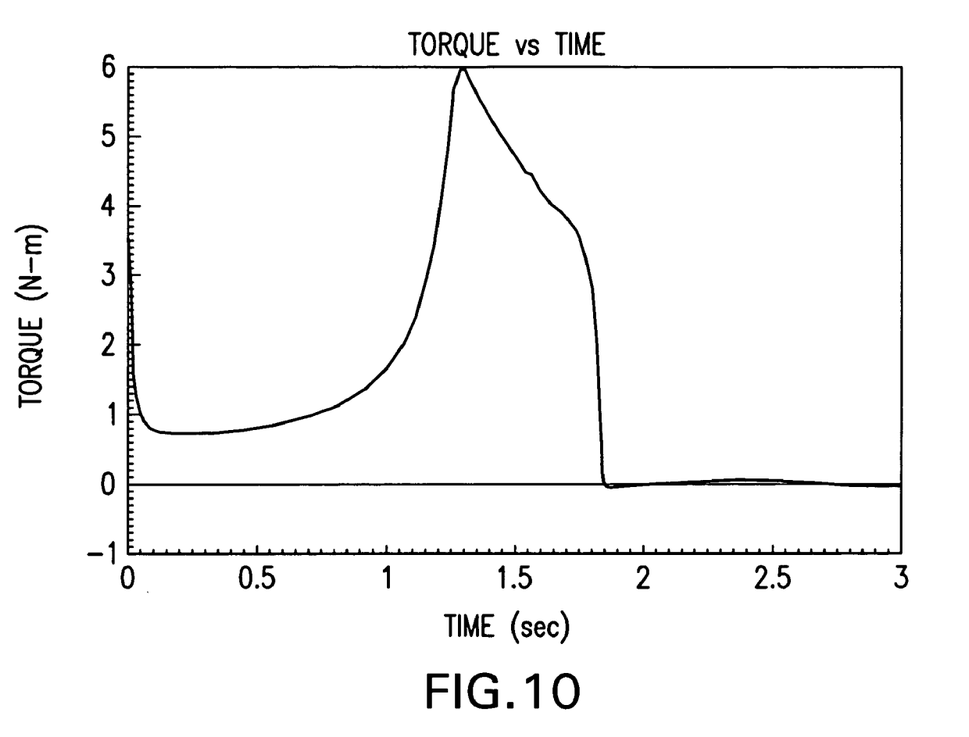
FIG. 10 is a graph of torque produced versus time for the known SRM of FIG. 1.

FIG. 10 shows a comparable computer simulation for the conventional SRM 11 shown in FIG. 1, for a comparison and with the embodiment of FIG. 4. Note the high spike indicative of torque ripple in the conventional design versus the smoother torque curve of the present invention. As can be seen, the present invention SRM produced torque ramp-up smoothly at the beginning and then is nearly at the peak for a major portion of the rotor travel, and finally rapidly drops to zero at the aligned position. Torque smoothing can be aided further by pole shaping and current profiling to enhance the capabilities of this motor if necessary or desired.

Thus, an SRM based on the present invention will show significant improvements in torque ripple and torque density, and in turn, significant improvements in efficiency and noise reduction. SRMs based on the present invention can be easily adapted to use control strategies, switching schemes, and circuit configurations utilized in the known art, thus making aspects of this invention very practical for present commercial implementation.

Figure 11:
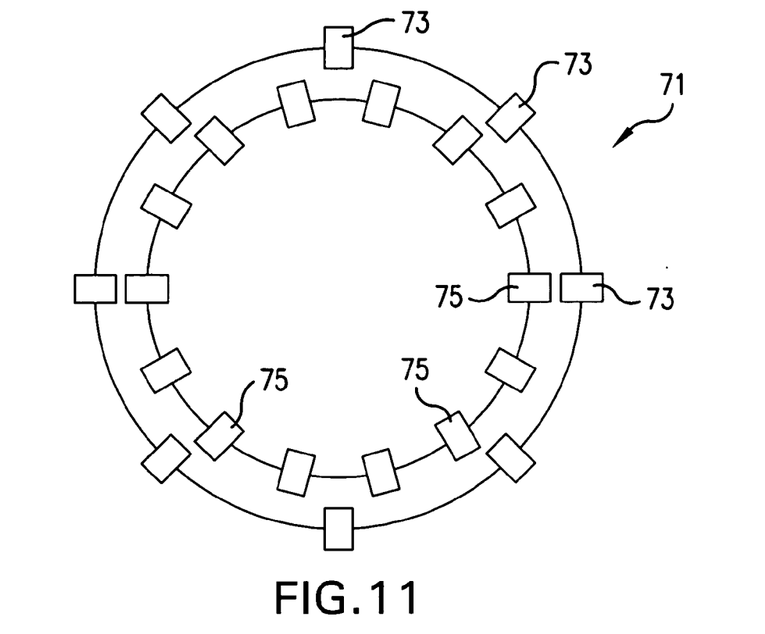
FIG. 11 illustrates a SRM of the present invention with 8 stator poles and 14 rotor poles.
Figure 12:
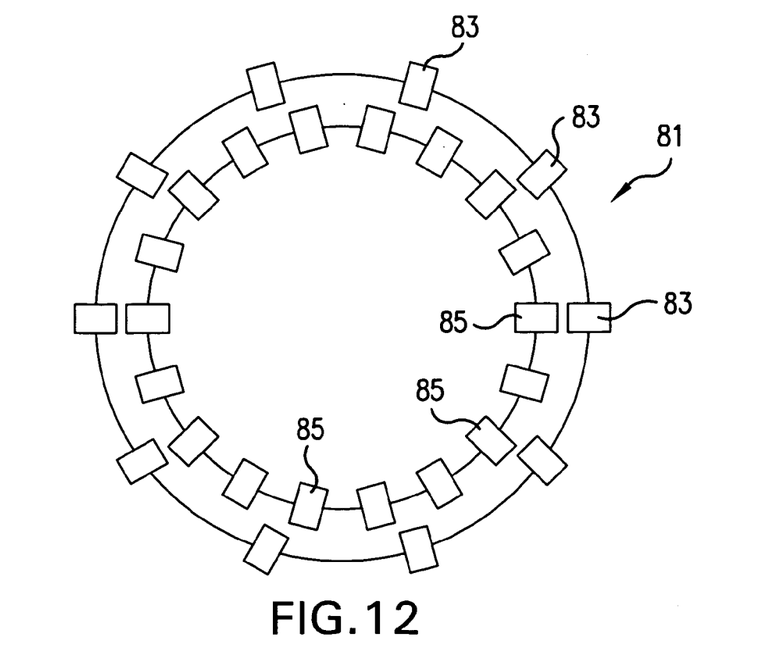
FIG. 12 illustrates a SRM of the present invention with 10 stator poles and 18 rotor poles.

As shown in FIGS. 4, 11, and 12 the present invention proposes a novel concept of a SRM having more rotor poles than stator poles in the following relationship:

Number of Rotor Poles ($R$)=2 times the Number of stator poles ($S$) minus 2, or $R=2S-2$, where $S>4$;

i.e., for any SRM having more than four stator poles.

The present invention is illustrated in an embodiment of a rotary SRM of 6 stator poles and ten rotor poles as shown in FIG. 4. The R=2S−2 relationship is further illustrated in FIG. 11 for an SRM 71 having 8 stator poles, collectively 73, and 14 rotor poles, collectively 75. The R=2S−2 relationship is further illustrated in FIG. 12 for an SRM 81 having 10 stator poles, collectively 83, and 18 rotor poles, collectively 85.

It will be apparent to the person of skill in the art that symmetries of stator and rotor are still preserved in these new designs and hence the method of operation applicable to prior art using the standard switching schemes and circuit topologies will be equally suitable for these new designs. Thus, any switching schemes, control strategies, and circuit configuration meant for a standard design of SRM can be used for these new designs too.

The present invention thus gives machine designers an additional degree of freedom to realize better efficiency, reduced noise and torque ripple, desirable torque-speed profiles, higher power density, and superior torque characteristics. These performance advantages can help boost the acceptance level of the SRMs and successfully fulfill the promises of SRMs being potential candidates for electromechanical energy conversion equipment.

While certain exemplary embodiments have been put forth to illustrate the present invention, these embodiments are not to be taken as limiting to the spirit or scope of the present invention which is defined by the appended claims.

Thus, although the present invention has been described with reference to preferred embodiment, modifications and rearrangements could be made and still the result would be within the scope and spirit of the invention.

We claim:

1. A switched reluctance machine having salient rotor poles and stator poles in a numerical relationship defined by the formula:

Number of Rotor Poles ($R$)=(2 times the Number of stator poles ($S$)) minus 2, or $R=2S-2$, where $S>4$;

wherein the stator poles comprise salient poles, two diametrically opposite stator poles form a phase of the switched reluctance machine, and, when the phase is energized, each of the two diametrically opposite stator poles aligns with not more than one rotor pole.

2. The switched reluctance machine of claim 1 wherein the switched reluctance machine is a rotary type.

3. The switched reluctance machine of claim 2 wherein the switched reluctance machine is a three phase type.

4. The switched reluctance machine of claim 1 wherein the switched reluctance machine is a three phase type.

5. The switched reluctance machine of claim 1 wherein S=6 and R=10.

6. The switched reluctance machine of claim 3 wherein S=6 and R=10.

7. The switched reluctance machine of claim 4 wherein S=6 and R=10.

8. The switched reluctance machine of claim 1 wherein S=8 and R=14.

9. The switched reluctance machine of claim 1 wherein S=10 and R18.

10. The switched reluctance machine of claim 1 further including an electrical control circuit operably attached to windings of the stator poles.

11. The switched reluctance machine of claim 2 further including an electrical control circuit operably attached to windings of the stator poles.

12. The switched reluctance machine of claim 3 further including an electrical control circuit operably attached to windings of the stator poles.

13. The switched reluctance machine of claim 4 further including an electrical control circuit operably attached to windings of the stator poles.

14. The switched reluctance machine of claim 5 further including an electrical control circuit operably attached to windings of the stator poles.

15. A switched reluctance machine having salient rotor poles and stator poles in a numerical relationship defined by the formula:

Number of Rotor Poles ($R$)=(2 times the Number of stator poles ($S$)) minus 2, or $R=2S-2$, where $S>4$, and the number of stator poles is double a number of phases, and each stator pole has only one stator tooth.

16. A switched reluctance machine having salient rotor poles and stator poles in a numerical relationship defined by the formula:

Number of Rotor Poles ($R$) =(2 times the Number of stator poles ($S$)) minus 2, or $R=2S-2$, where $S>4$, and wherein one pair of stator poles is energized per phase of the switched reluctance machine to align with only one pair of rotor poles.

\* \* \* \* \*